US012644511B2

(12) United States Patent  
Riedel et al.

(10) Patent No.: US 12,644,511 B2  
(45) Date of Patent: Jun. 2, 2026

(54) ELECTRIC AXLE DRIVE TRAIN, CONTROL UNIT, AND COMPUTER PROGRAMME PRODUCT

(71) Applicant: Schaeffler Technologies AG & Co. KG, Herzogenaurach (DE)

(72) Inventors: Thomas Riedel, Erlangen (DE); Robert Schieck, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 84 days.

(21) Appl. No.: 18/689,117

(22) PCT Filed: Aug. 1, 2022

(86) PCT No.: PCT/DE2022/100549  
§ 371 (c)(1),  
(2) Date: Mar. 5, 2024

(87) PCT Pub. No.: WO2023/051855  
PCT Pub. Date: Apr. 6, 2023

(65) Prior Publication Data  
US 2024/0369130 A1 Nov. 7, 2024

(30) Foreign Application Priority Data  
Sep. 28, 2021 (DE) .......................... 102021125114.4

(51) Int. Cl.  
*F16H 57/01* (2012.01)  
*B60L 3/00* (2019.01)  
(Continued)

(52) U.S. Cl.  
CPC ............ *F16H 57/01* (2013.01); *B60L 3/0023* (2013.01); *B60L 3/12* (2013.01); *B60L 15/20* (2013.01);  
(Continued)

(58) Field of Classification Search  
CPC .. F16H 57/01; F16H 2057/012; B60L 3/0023; B60L 3/12; B60L 15/20; B60L 2240/423; B60L 2240/429  
See application file for complete search history.

(56) References Cited

U.S. PATENT DOCUMENTS

2021/0010581 A1\* 1/2021 Fukuda ................. G01M 13/02  
2024/0369130 A1\* 11/2024 Riedel ..................... F16H 57/01

FOREIGN PATENT DOCUMENTS

DE        102007010281        10/2008  
DE        102007010281 B3 \* 10/2008 .......... G01M 13/027  
(Continued)

OTHER PUBLICATIONS

English Machine Translation DE-102007010281-B3 (Year: 2007).\*  
(Continued)

*Primary Examiner* — Andrew J Cromer  
(74) *Attorney, Agent, or Firm* — Volpe Koenig

(57) ABSTRACT

An electric axle drive train having an electric machine having a rotor which is mounted rotatably relative to a stator and can be supplied with current by a control unit; a gear assembly which is coupled to the rotor; and a first rotatably mounted output shaft which is operatively connected to the gear assembly in a torque-transmitting manner. An actuatable rotation blocking device is positioned in the torque flow between the rotor and the first output shaft in such a way that a rotation of the shafts lying in the torque flux can be blocked, and furthermore at least one rotational angle sensor is positioned between the rotor and the rotation blocking device in such a way that it provides a signal, that represents the rotational angle position, to a shaft lying between the rotor and the rotation blocking device.

9 Claims, 1 Drawing Sheet

(51) Int. Cl.
  B60L 3/12            (2006.01)
  B60L 15/20           (2006.01)
(52) U.S. Cl.
  CPC ...  *B60L 2240/423* (2013.01); *B60L 2240/429*
                 (2013.01); *F16H 2057/012* (2013.01)

(56)                References Cited

FOREIGN PATENT DOCUMENTS

| DE | 102010048837 | 4/2012 |
| DE | 102011119466 | 5/2013 |
| DE | 102011119466 A1 * | 5/2013 | ............. F16H 57/01 |
| DE | 112019001422 | 12/2020 |
| EP | 2498076 | 9/2012 |
| EP | 3734117 | 9/2023 |

OTHER PUBLICATIONS

English Machine Translation DE-102011119466-A1 (Year: 2011).*
Erik Schneider, Frank Fickl, Bernd Cebulski and Jens Liebold with
the title: "Hochintegrativ und Flexibel Elektrische Antriebseinheit
für E-Fahrzeuge" [Highly integrative and flexible electric drive unit
for e-vehicles], ATZ magazine, vol. 113, pp. 360-365, May 2011.

* cited by examiner

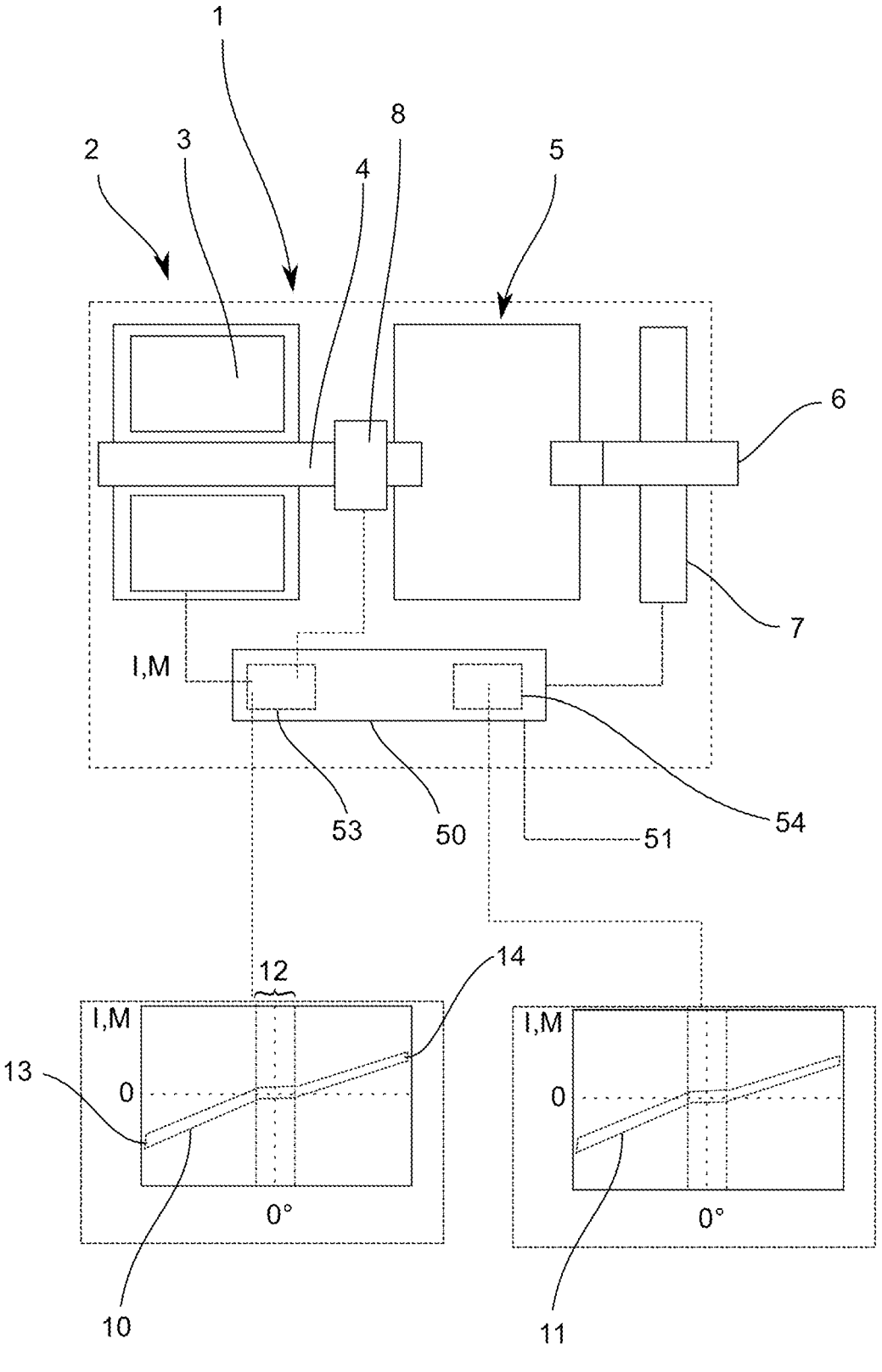

ELECTRIC AXLE DRIVE TRAIN, CONTROL UNIT, AND COMPUTER PROGRAMME PRODUCT

CROSS-REFERENCE TO RELATED APPLICATIONS

This application is the U.S. National Phase of PCT Appln. No. PCT/DE2022/100549, filed Aug. 1, 2022, which claims the benefit of German Patent Appln. No. 10 2021 125 114.1, filed Sep. 28, 2021, the entire disclosures of which are incorporated by reference herein.

TECHNICAL FIELD

The present disclosure relates to an electric axle drive train comprising an electric machine having a rotor which is mounted rotatably relative to a stator and can be supplied with current by a control unit; a gear assembly which is coupled to the rotor; and a first rotatably mounted output shaft which is operatively connected to the gear assembly in a torque-transmitting manner, wherein an actuatable rotation blocking device is positioned in the torque flow between the rotor and the first output shaft in such a way that a rotation of the shafts lying in the torque flux can be blocked, and furthermore at least one rotational angle sensor is positioned between the rotor and the rotation blocking device in such a way that it provides a signal, that represents the rotational angle position, to a shaft lying between the rotor and the rotation blocking device. The disclosure also relates to a control unit and a computer program product.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, May 2011, pages 360-365 by Erik Schneider, Frank Fickl, Bernd Cebulski and Jens Liebold with the title: "Hochintegrativ und Flexibel Elektrische Antriebseinheit für E-Fahrzeuge" [Highly integrative and flexible electric drive unit for e-vehicles], which is probably the closest prior art. This article describes a drive unit for an axle of a vehicle, which comprises an electric motor that is arranged to be concentric and coaxial with a bevel gear differential, wherein a shiftable 2-speed planetary gear set is arranged in the drive train between the electric motor and the bevel gear differential, which is also positioned to be coaxial to the electric motor or the bevel gear differential or spur gear differential. The drive unit is very compact and allows for a good compromise between climbing ability, acceleration and energy consumption due to the switchable 2-speed planetary gear set. Such drive units are also referred to as e-axles or electrically operable drive trains.

DE 10 2010 048 837 A1 discloses such a drive device having at least one electric motor and at least one planetary differential that can be driven by a rotor of the electric motor, wherein the planetary differential has at least one planetary carrier that is operatively connected to a rotor of the electric motor, first planetary gears and second planetary gears, which are rotatably mounted on the planetary carrier, and a first sun gear and a second sun gear, each of which is operatively connected to an output shaft of the planetary differential. The first planetary gears mesh with the first sun gear and each of the second planetary gears meshes with the second sun gear and with one of the first planetary gears. Furthermore, the sun gears are arranged coaxially with an axis of rotation of the rotor.

As in conventional drive concepts with an internal combustion engine, an electrically operated axle drive train is also subject to mechanical and/or electrical wear. There is a continuing need to determine and evaluate vehicle-specific wear scenarios when the motor vehicle is in operation.

SUMMARY

It is therefore the object of the present disclosure to provide an electric axle drive train that enables vehicle-specific wear scenarios to be determined and evaluated during operation of the motor vehicle.

This object is achieved by an electric axle drive train comprising an electric machine with a rotor which is rotatably mounted relative to a stator and which can be supplied with current by a control unit, as well as a gear assembly coupled to the rotor and a first, rotatably mounted output shaft which is operatively connected to the gear assembly in a torque-transmitting manner, wherein an actuatable rotation blocking device is arranged in the torque flow between the rotor and the first output shaft in such a way that a rotation of the shafts in the torque flow can be blocked, and at least one rotational angle sensor is further arranged between the rotor and the rotation blocking device in such a way that it provides a signal representing the rotational angle position of a shaft positioned between the rotor and the rotation blocking device, wherein the control unit is configured to determine mechanical wear of the rotatable components lying in the flow of torque between the rotor and the rotation blocking device, in that the rotation blocking device blocks the rotation of the shafts positioned in the torque flow between the rotor and the rotation blocking device, and then the electric machine is supplied with an increasing current intensity up to a predefined first current intensity threshold value so that an increasing torque acting in a first direction of rotation is applied to the rotor, and then the electric machine is supplied with an increasing current intensity up to a predefined second current threshold value so that an increasing torque acting in a second direction of rotation is applied to the rotor, wherein in the control unit when the electric machine is being supplied with current, the current intensity and its temporally associated signals of the rotational angle sensor representing a rotational angle position are detected, and the corresponding current intensity and rotational angle position values are correlated to form an actual wear characteristic, and this is compared with a target wear characteristic stored in the control unit, wherein in the event of a deviation of the actual wear characteristic from the target wear characteristic, an output signal representing the deviation is generated by the control unit.

As a result, an axle drive train can be provided which, during operation, can determine the wear of mechanical components and components that transmit traction torque and, for example, indicate a deviation from a predicted wear scenario to the driver or operator of the motor vehicle. The axle drive train according to the disclosure will also have steadily increasing wear and tear as the service life increases and the play associated therewith, which is also known as torsional play or backlash in the drive train.

For example, the axle drive train according to the disclosure can first be placed in an operating state in which a rotation blocking device, such as a parking brake or parking lock of the drive train, is transferred to its blocking position. The electric machine is then controlled, for example, in such a way that a defined load is set via a torque build-up of the electric machine, first forwards and then backwards. After this, the rotational angle of the rotor of the electric machine can then be analyzed, for example using a standard resolver in PSM machines. In principle, it would of course also be possible to provide a separate rotational angle sensor for the rotor or the rotor shaft of the electric machine. The signals from the rotational angle sensor that represent a rotational angle position are determined in the control unit, and the corresponding current intensity and rotational angle position values are correlated to form an actual wear characteristic. This actual wear characteristic is then compared with a target wear characteristic stored in the control unit, wherein the control unit generates an output signal representing the deviation if the actual wear characteristic deviates from the target wear characteristic.

The correlation of the actual wear characteristic requires at least two values of current intensity and rotational angle. From these, a function can then be derived via interpolation, which defines the actual wear characteristic. Additionally or alternatively, it is possible for a large number of discrete current intensity values and rotational angle position values to be determined and used as interpolation points for an actual wear characteristic.

First, the individual elements of the claimed subject matter according to the disclosure are explained in the order in which they are named in the claims and particularly preferred embodiments of the subject matter according to the disclosure are described below.

An electric axle drive train, in particular of a motor vehicle, can comprise at least one electric machine and at least one gear assembly, wherein the electric machine and the gear assembly form a structural unit. It can in particular be provided for an electric machine and a gear assembly to each be arranged in a common drive train housing. Alternatively, it would of course also be possible for the electric machine to have a motor housing and the transmission to have a transmission housing, wherein the structural unit can then be effected by fixing the gear assembly in relation to the electric machine. This structural unit is sometimes also referred to as an e-axle.

In connection with the disclosure, the electric machine can be designed as a radial or axial flux machine. In order to form an axially particularly compact axle drive train, preference should be given to axial flow machines. The electric machine is intended in particular for use within an electrically operable drive train of a motor vehicle.

In particular, the electric machine is dimensioned such that vehicle speeds of more than 50 km/h, preferably more than 80 km/h and in particular more than 100 km/h can be achieved. The electric motor particularly preferably has an output of more than 30 kW, preferably more than 50 KW and in particular more than 70 KW. Furthermore, it is preferred that the electric machine provides speeds greater than 5,000 rpm, particularly preferably greater than 10,000 rpm, very particularly preferably greater than 12,500 rpm.

The gear assembly of the electric axle drive train can, in particular, be coupled to the electric machine, which is designed to generate a drive torque for the motor vehicle. The drive torque is particularly preferably a main drive torque so that the motor vehicle is driven exclusively by the drive torque.

The axle drive train according to the disclosure can have a control unit. A control unit, as used in the present disclosure, serves in particular for the electronic control and/or regulation of one or more technical systems of a motor vehicle. In particular, a control unit for controlling and/or regulating the electric machine can be provided.

A control unit particularly preferably has a wired or wireless signal input for receiving electrical signals, in particular, such as sensor signals. Furthermore, a control unit likewise preferably has a wired or wireless signal output for the transmission of, in particular, electrical signals, for example to electrical actuators or electrical consumers of the motor vehicle.

Open-loop control operations and/or closed-loop control operations can be carried out within the control unit. It is very particularly preferable that the control unit comprises hardware that is designed to run software. The control unit preferably comprises at least one electronic processor for executing program sequences defined in a software.

The control unit can also have one or more electronic memories in which the data contained in the signals transmitted to the control unit can be stored and read out again. Furthermore, the control unit can have one or more electronic memories in which data can be stored in a changeable and/or unchangeable manner.

A control unit can comprise a plurality of control devices which are arranged in particular spatially separate from one another in the motor vehicle. Control devices are also referred to as electronic control units (ECU) or electronic control modules (ECM) and preferably have electronic microcontrollers for carrying out computing operations for processing data, particularly preferably using software. The control devices can preferably be networked with one another so that a wired and/or wireless data exchange between control devices is made possible. In particular, it is also possible to network the control devices with one another via bus systems present in the motor vehicle, such as a CAN bus or LIN bus.

The control unit can particularly preferably comprise a power electronics unit for the stator or rotor. A power electronics unit is preferably a combination of different components that control or regulate a current to the electric machine, preferably including the peripheral components required for this purpose, such as cooling elements or power supply units. In particular, the power electronics unit contains one or more power electronics components that are configured to control or regulate a current. This is particularly preferably one or more power switches, such as power transistors. The power electronics unit particularly preferably has more than two, particularly preferably three, phases or current paths which are separate from one another and each have at least one separate power electronics component. The power electronics unit is preferably designed to control or regulate a power per phase with a peak power, preferably continuous power, of at least 10 W, preferably at least 100 W, particularly preferably at least 1000 W.

According to an advantageous embodiment, it can be provided that the detection of a deviation of the actual wear characteristic from the target wear characteristic takes place within a rotational angle position interval stored in the control unit. In this connection, according to a further preferred further development, it can be provided that the rotational angle position interval contains a rotational angle zero point. It can thus be achieved that a particularly accurate and reliable wear measurement or service life prediction can be implemented.

The rotational angle zero point occurs when the axle drive train is in a load-free state and when the electric machine is not supplied with current. This can be the case, for example, when the motor vehicle is not in use.

Furthermore, according to a likewise advantageous embodiment, it can be provided that the output signal representing the deviation contains information about the degree of deviation, the position and/or size of the deviation in the wear characteristics. The advantageous effect of this configuration is based on the fact that a more extensive analysis of the wear or damage scenario can be implemented from this.

According to a further particularly preferred embodiment, it can be provided that the rotation blocking device is a parking lock and/or a braking device. In this way, in particular, the effect can be achieved that components already present in a drive train can often be used in order to enable a wear analysis.

Furthermore, the disclosure can also be further developed in that the rotational angle sensor is an absolute rotational angle sensor. In a likewise preferred embodiment, it can also be provided that the rotational angle sensor is a resolver of a permanently excited synchronous machine. It can also be advantageous to further develop the disclosure in such a way that the rotational angle sensor determines the rotational angle position of the rotor.

According to a further preferred embodiment of the subject matter disclosed herein, it can be provided that the first current intensity threshold value and the second current intensity threshold value each represent the current intensity corresponding to the maximum rated power of the electric machine.

The object of the disclosure is also achieved by a control unit for an electric axle drive train, with a processor and a memory, wherein the control unit is configured to determine mechanical wear on the rotatable components positioned in the torque flow between a rotor of an electric machine and a rotation blocking device, in that the control unit generates a control signal which causes the rotation blocking device to be actuated so that the rotation blocking device blocks the rotation of the shafts positioned in the torque flow between the rotor and the rotation blocking device, and the control unit then supplies the electric machine with an increasing current intensity up to a predefined first current intensity threshold value so that an increasing torque acting in a first direction of rotation is applied to the rotor, and the control unit then supplies the electric machine with an increasing current intensity up to a predefined second current intensity threshold value so that an increasing torque acting in a second direction of rotation is applied to the rotor, wherein in the control unit when the electric machine is being supplied with current, the current intensity and its temporally associated signals of the rotational angle sensor representing a rotational angle position are detected, and the corresponding current intensity and rotational angle position values are correlated to form an actual wear characteristic, and this is compared with a target wear characteristic stored in the control unit, wherein in the event of a deviation of the actual wear characteristic from the target wear characteristic, an output signal representing the deviation is generated by the control unit.

Finally, the object of the disclosure can also be achieved by a computer program product stored on a machine-readable carrier, or a computer data signal made manifest by an electromagnetic wave, with a computer program code suitable for carrying out a method comprising the following steps:

generating a control signal which causes a rotation blocking device to be actuated so that the rotation blocking device blocks the rotation of shafts positioned in the torque flow between a rotor and the rotation blocking device, supplying the electric machine with an increasing current intensity up to a predefined first current threshold value so that an increasing torque acting in a first direction of rotation is applied to the rotor, supplying the electric machine with an increasing current intensity up to a predefined second current threshold value so that an increasing torque acting in a second direction of rotation is applied to the rotor, detecting the current strength and its temporally associated signals, representing a rotational angle position, of a rotational angle sensor, which is positioned between the rotor and the rotation blocking device, while the electric machine is supplied with current, correlating the corresponding current intensity and rotational angle position values to an actual wear characteristic, and comparing this with a target wear characteristic stored in the control unit, wherein with a deviation of the actual wear characteristic from the target wear characteristic, an output signal representing the deviation is generated.

BRIEF DESCRIPTION OF THE DRAWINGS

The disclosure will be explained in more detail below with reference to figures without limiting the general concept of the disclosure.

In the figures:

FIG. 1 shows an electric axle drive train in a schematic block diagram.

DETAILED DESCRIPTION

FIG. 1 shows an electric axle drive train 1 comprising an electric machine 2 with a rotor 4 which is rotatably mounted relative to a stator 3 and which can be supplied with current by a control unit 50. The axle drive train 1 also has a gear assembly 5 coupled to the rotor 4 and a first, rotatably mounted output shaft 6 operatively connected to the gear assembly 5 in a torque-transmitting manner.

An actuatable rotation blocking device 7 is arranged in the torque flow between the rotor 4 and the first output shaft 6 in such a way that rotation of the shafts lying in the torque flow can be blocked. Furthermore, at least one rotational angle sensor 8 is arranged between the rotor 4 and the rotation blocking device 7 in such a way that it provides a signal representing the rotational angle position of a shaft lying between the rotor 4 and the rotation blocking device 7.

The control unit 50 is configured to determine mechanical wear on the rotatable components lying in the torque flow between the rotor 4 and the rotation blocking device 7, in that the rotation blocking device 7 blocks the rotation of the shafts lying in the torque flow between the rotor 4 and the rotation blocking device 7, and subsequently the electric machine 2 is supplied with an increasing current intensity up to a predefined first current threshold value 13 so that an increasing torque acting in a first direction of rotation is applied to the rotor 4. The electric machine 2 is then supplied with an increasing current intensity up to a predefined second current threshold value 14 so that an increasing torque acting in a second direction of rotation is applied to the rotor 4. In the control unit 50, the current intensity and its temporally associated signals, representing a rotational angle position, of the rotational angle sensor 8 are detected while the electric machine 2 is being supplied with current.

The corresponding current intensity and rotational angle position values are then correlated to an actual wear characteristic 10. This is then compared with a target wear characteristic 11 stored in the control unit 50, wherein the control unit 50 generates an output signal 51 representing the deviation if the actual wear characteristic 10 deviates from the target wear characteristic 11. The output signal 51 representing the deviation can contain additional information about the degree of deviation, the position and/or size of the deviation in the wear characteristics 10, 11.

FIG. 1 also shows that a deviation of the actual wear characteristic 10 from the target wear characteristic 11 is detected within a rotational angle position interval 12 stored in the control unit 50, which contains a rotational angle zero point.

The rotation blocking device 7 can be a parking lock and/or a braking device, for example. The rotational angle sensor 8 is an absolute rotational angle sensor, in particular a resolver of a permanently excited synchronous machine, which determines the rotational angle of the rotor 4.

The control unit 50 has a processor 53 and a memory 54 and is configured to determine mechanical wear of the rotatable components lying in the torque flow between the rotor 4 of the electric machine 2 and the rotation blocking device 7. For this purpose, the control unit 50 generates a control signal which causes the rotation blocking device 7 to be actuated so that the rotation blocking device 7 blocks the rotation of the shafts positioned in the torque flow between the rotor 4 and the rotation blocking device 7.

The control unit 50 then supplies the electric machine 2 with an increasing current intensity up to a predefined first current threshold value so that an increasing torque acting in a first direction of rotation is applied to the rotor 4, and the control unit 50 then supplies the electric machine 2 with a increasing current intensity up to a predefined second current intensity threshold value so that an increasing torque acting in a second direction of rotation is applied to the rotor 4. While the electric machine 2 is being supplied with current, the control unit 50 detects the current intensity and its temporally associated signals, which represent a rotational angle position, from the rotational angle sensor 8 which is positioned between the rotor 4 and the rotation blocking device 7. The corresponding current intensity and rotational angle position values are then correlated to an actual wear characteristic 10 and this is compared with a target wear characteristic 11 stored in the control unit 50. If the actual wear characteristic 10 deviates from the target wear characteristic 11, the control unit 50 generates an output signal 51 representing the deviation.

The memory 54 of the control unit 50 has a computer program code suitable for carrying out a method comprising the following steps:

First, a control signal is generated which causes a rotation blocking device 7 to be actuated so that the rotation blocking device 7 blocks the rotation of shafts positioned in the torque flow between a rotor 4 and the rotation blocking device 7.

Then, the electric machine 2 is supplied with an increasing current up to a predefined first current threshold value so that an increasing torque acting in a first direction of rotation is applied to the rotor 4.

Then, the electric machine 2 is supplied with an increasing current intensity up to a predefined second current threshold value so that an increasing torque acting in a second direction of rotation is applied to the rotor 4.

This is followed by detecting the current intensity and its temporally associated signals, representing a rotational angle position, of a rotational angle sensor 8, which is positioned between the rotor 4 and the rotation blocking device 7, while the electric machine 2 is supplied with current.

Finally, the corresponding current intensity and rotational angle position values are correlated to form an actual wear characteristic 10 and compared with a target wear characteristic 11 stored in the control unit 50, wherein with a deviation of the actual wear characteristic 10 from the target wear characteristic 11, an output signal 51 representing the deviation is generated.

The disclosure is not limited to the embodiments shown in the figures. The above description is therefore not to be regarded as limiting, but rather as illustrative. The following claims are to be understood as meaning that a named feature is present in at least one embodiment according to the disclosure. This does not exclude the presence of further features. If the patent claims and the above description define 'first' and 'second' features, this designation serves to distinguish between two features of the same type without defining an order of precedence.

LIST OF REFERENCE SIGNS

1 Axle drive train
2 Electric machine
3 Stator
4 Rotor
5 Control unit
6 Output shaft
7 Rotation blocking device
8 Rotational angle sensor
10 Actual wear characteristic
11 Target wear characteristic
12 Rotational angle position interval
13 Current intensity threshold value
14 Current intensity threshold value
50 Control unit
51 Output signal
53 Processor
54 Memory

The invention claimed is:

1. An electric axle drive train comprising:

an electric machine having a rotor which is mounted rotatably relative to a stator and is suppliable with current by a control unit; a gear assembly coupled to the rotor;

a first rotatably mounted output shaft which is operatively connected to the gear assembly in a torque-transmitting manner;

an actuatable rotation blocking device positioned in a torque flow between the rotor and the first output shaft in such that a rotation of the shafts lying in a torque flux is blockable;

at least one rotational angle sensor is positioned between the rotor and the rotation blocking device in such that the rotational angle sensor provides a signal, that represents a rotational angle position of one of the shaft lying between the rotor and the rotation blocking device;

wherein the control unit is configured to determine mechanical wear on rotatable components positioned in the torque flow between the rotor and the rotation blocking device, in that the rotation blocking device blocks the rotation of the shafts positioned in the torque flow between the rotor and the rotation blocking device, and then the electric machine is supplied with an increasing current intensity up to a predefined first current threshold value so that an increasing torque acting in a first direction of rotation is applied to the rotor, and then the electric machine is supplied with an increasing current intensity up to a predefined second current intensity threshold value so that an increasing torque acting in a second direction of rotation is applied to the rotor, and in the control unit when the electric machine is being supplied with current, the current intensity and temporally associated signals of the rotational angle sensor representing a rotational angle position are detected; and the current intensity and the rotational angle position values are correlated to form an actual wear characteristic that is compared with a target wear characteristic stored in the control unit, wherein in the and in an event of a deviation of the actual wear characteristic from the target wear characteristic, an output signal representing the deviation is generated by the control unit;

wherein the control unit is further configured to determine a maintenance requirement of the electric axle drive train based on the output signal; and wherein the control unit is further configured to, in response to the output signal, initiate a maintenance action for the electric machine.

2. The axle drive train according to claim 1, wherein a detection of the deviation of the actual wear characteristic from the target wear characteristic takes place within a rotational angle position interval stored in the control unit.

3. The axle drive train according to claim 2, wherein the rotational angle position interval contains a rotational angle zero point.

4. The axle drive train according to claim 1, wherein the output signal representing the deviation contains information about a degree of deviation, a position, and/or size of the deviation in the wear characteristics.

5. The axle drive train according to claim 1, wherein the rotation blocking device is at least one of a parking lock or a braking device.

6. The axle drive train according to claim 1, wherein the rotational angle sensor is an absolute rotational angle sensor.

7. The axle drive train according to claim 1, wherein the rotational angle sensor is a resolver of a permanently excited synchronous machine.

8. The axle drive train according to claim 1, wherein the rotational angle sensor determines the rotational angle of the rotor.

9. The axle drive train according to claim 1, wherein the maintenance action includes at least one of disabling or limiting operation of the electric machine, adjusting a torque output of the electric machine, placing the axle drive train into a service mode, or triggering a maintenance procedure for one or more components of the axle drive train.

* * * * *